United States Patent [19]

Martell

[11] Patent Number: 4,940,180
[45] Date of Patent: Jul. 10, 1990

[54] THERMALLY STABLE DIAMOND ABRASIVE COMPACT BODY

[76] Inventor: Trevor J. Martell, 8 Erica Place, Vale Road, Weltevreden Park, Transvaal, South Africa

[21] Appl. No.: 389,613

[22] Filed: Aug. 4, 1989

[30] Foreign Application Priority Data

| Aug. 4, 1988 [ZA] | South Africa | 88/5735 |
| Feb. 2, 1989 [ZA] | South Africa | 89/0823 |
| Feb. 2, 1989 [ZA] | South Africa | 89/0825 |

[51] Int. Cl.$^5$ .................. B23K 31/04; C04B 35/52
[52] U.S. Cl. .................... 228/122; 228/124; 228/187; 228/228; 228/234; 76/DIG. 12; 76/108.2; 419/11
[58] Field of Search ............ 228/122, 124, 187, 228, 228/234, 903; 76/108 A, DIG. 12; 419/11; 51/295

[56] References Cited

U.S. PATENT DOCUMENTS

| 4,241,135 | 12/1980 | Lee et al. | 419/11 |
| 4,766,040 | 8/1988 | Hillert et al. | 419/11 |
| 4,776,862 | 10/1988 | Wiand | 228/122 |

FOREIGN PATENT DOCUMENTS

| 185537 | 6/1986 | European Pat. Off. | 228/122 |
| 11877 | 1/1982 | Japan | 419/11 |
| 56382 | 4/1982 | Japan | 419/11 |

Primary Examiner—Richard K. Seidel
Assistant Examiner—Samuel M. Heinrich
Attorney, Agent, or Firm—Scully, Scott, Murphy & Presser

[57] ABSTRACT

A method of producing a thermally stable diamond compact having a metal layer bonded to a surface thereof is provided. The thermally stable diamond compact comprises a mass of diamond particles containing diamond-to-diamond bonding and a second phase uniformly distributed through the diamond mass. The metal of the metallic layer is molybdenum, tantalum, titanium or like high melting refractory metal, nickel or an alloy containing a dominant amount of any one of these metals. The method includes the steps of:

(i) preparing an assembly of a metallic layer, a mass of diamond particles on the metallic layer and a layer of the component or components necessary to form the second phase on the diamond particles, this component or these components having a melting point lower than that of the metallic layer; and (ii) placing the assembly in a canister and subjecting the assembly to conditions of elevated temperature and pressure for a period sufficient to produce the diamond abrasive compact, the temperature being first raised to a level where the component or components for the second phase are molten allowing their infiltration into the diamond mass and the compact to be produced, but the metallic layer is not molten, and thereafter raising it to a level where the metallic layer bonds to the thus formed compact.

10 Claims, 1 Drawing Sheet

THERMALLY STABLE DIAMOND ABRASIVE COMPACT BODY

BACKGROUND OF THE INVENTION

This invention relates to a thermally stable diamond abrasive compact body.

Diamond abrasive compacts are well known in the art and consist essentially of a mass of diamond abrasive particles present in an amount of at least 70 percent, preferably 80 to 90 percent, by volume of the compact bonded into a hard conglomerate. Compacts are polycrystalline masses and can replace single large crystals in many applications. Diamond abrasive compacts are also known as polycrystalline diamond or PCD.

Diamond compacts will typically contain a second phase uniformly distributed through the diamond mass. The second phase may contain a dominant amount of a catalyst/solvent for diamond synthesis such as cobalt, nickel or iron. Diamond compacts having second phases of this nature will generally not have thermal stability above 700° C.

Diamond abrasive compacts may be used alone or as composite compacts in which event they are backed with a cemented carbide substrate. Composite diamond abrasive compacts wherein the second phase contains a diamond catalyst/solvent are widely used in industry.

Examples of composite diamond abrasive compacts are described in U.S. Pat. No. 3,745,623 and British Patent Specification No. 1,489,130.

Diamond abrasive compacts of the type described above are thermally sensitive above a temperature of about 700° C. There are, however, described in the literature and in commercial use several diamond abrasive compacts which are thermally stable above 700° C. For example, U.S. Pat. No. 4,224,380 describes a thermally stable diamond compact which comprises self-bonded diamond particles comprising between about 70% and 95% by volume of the product, a metallic phase infiltrated substantially uniformly throughout the product, the phase comprising between about 0,05% and 3% by volume of the product and a network of interconnected, empty pores dispersed throughout the product and defined by the particles and the metallic phase, the pores comprising between 5% and 30% by volume of the product.

U.S. Pat. No. 4,534,773 describes a thermally stable diamond abrasive compact which comprises a mass of diamond particles present in an amount of 80 to 90% by volume of the body and a second phase present in an amount of 10 to 20% by volume of the body, the mass of diamond particles containing diamond-to-diamond bonding to form a coherent, skeletal mass and the second phase containing nickel and silicon, the nickel being in the form of nickel and/or nickel silicide and the silicon being in the form of silicon, silicon carbide and/or nickel silicide.

British Patent Publication No. 2158086 describes a thermally stable diamond abrasive compact similar to that described in U.S. Pat. No. 4,534,773 save that the second phase consists essentially of silicon in the form of silicon carbide and/or silicon.

EPA 0261948 published Mar. 30, 1988 describes a method of making a composite diamond abrasive compact comprising a thermally stable diamond compact bonded to a cemented carbide substrate including the steps of forming an unbonded assembly comprising a thermally stable diamond compact comprising a mass of diamond particles containing diamond-to-diamond bonding to form a coherent, skeletal mass, and a second phase uniformly distributed through the diamond mass, a cemented carbide substrate and a layer of nickel or a nickel-rich alloy between the compact and the substrate, placing the unbonded assembly in the reaction zone of a high pressure/high temperature apparatus, subjecting the unbonded assembly to a temperature of at least 1000° C. and simultaneously a pressure of at least 30 kilobars for a time sufficient to cause bonding to occur between the compact and the substrate and removing the composite diamond abrasive compact from the reaction zone.

U.S. Pat. No. 4,380,471 describes a process for simultaneously cementing diamond particles together and affixing the cemented diamond particles to a substrate comprising the steps of:

(a) disposing within a refractory metal container a mass of silicon-containing metal, a quantity of diamond powder, a cemented carbide body and a layer made of a barrier metal selected from the group consisting of tantalum, vanadium, molybdenum, zirconium, tungsten and alloys thereof, the layer of barrier material being disposed between the cemented carbide and at least a portion of the quantity of diamond powder and the quantity of diamond powder being disposed between the silicon atom-containing metal and the cemented caride body to form an assembly, and (b) simultaneously applying heat and pressure to the assembly to melt the silicon atom-containing metal and cause the molten metal to infiltrate the diamond powder adjacent to and make contact with the layer of barrier material.

It is to be noted that this method involves a one stage application of heat and pressure to the assembly.

SUMMARY OF THE INVENTION

A method of producing a thermally stable diamond compact having a metallic layer bonded to a surface thereof, the thermally stable diamond compact comprising a mass of diamond particles containing diamond-to-diamond bonding to form a coherent, skeletal mass and a second phase uniformly distributed through the diamond mass, and the metal of the metallic layer being selected from the group of molybdenum, tantalum, titanium and like high melting refractory metal, nickel and an alloy containing a dominant amount of any one of these metals, includes the steps of:

(i) preparing an assembly of a metallic layer, a mass of diamond particles on the metallic layer and a layer of the component or components necessary to form the second phase on the diamond particles, this component or these components having a melting point lower than that of the metallic layer; and (ii) subjecting the assembly to conditions of elevated temperature and pressure for a period sufficient to produce the diamond abrasive compact, the temperature being controlled such that there is minimal infiltration of the metallic layer into the diamond mass.

DESCRIPTION OF EMBODIMENTS

Figure 1:
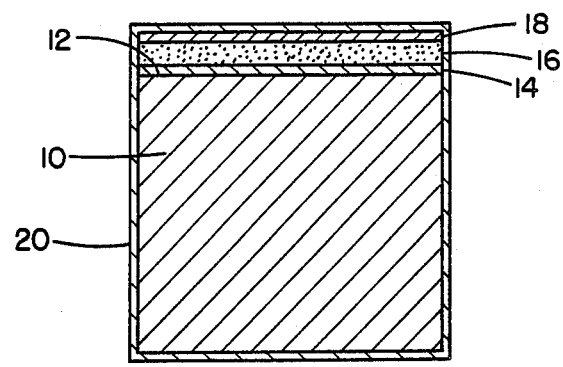
FIG. 1 is a schematic view of an assembly useful in carrying out the method of the invention.

The temperature is preferably controlled by first raising it to a level where the component or components for the second phase are molten allowing their infiltration into the diamond mass and the compact to be produced, but the metallic layer is not molten, and thereafter raising it to a level where the metallic layer bonds to the thus formed compact. In this way, it has been found, that the component or components for the second phase can infiltrate the diamond mass and produce the thermally stable diamond compact before there is any infiltration of the metal into the diamond mass. Minimal infiltration of the metal into the diamond mass takes place. It has been found that infiltration of less than 100 microns, generally less than 50 microns, into the diamond mass can be achieved. Typically, the temperature in the first stage will be in the range 1100° to 1350° C. and the temperature in the second stage higher than that of the first stage. The temperature in the second stage will generally be in the range 1300° C. to 1900° C. In each stage, the elevated temperature will be maintained for a period which will generally not exceed 10 minutes.

The elevated pressure which is applied will typically be in the range 27 kilobars to 70 kilobars.

The assembly will be subjected to the elevated temperature and pressure conditions in the reaction zone of a conventional high temperature/high pressure apparatus. The assembly will remain in this reaction zone until the bonded product has been produced.

The thermally stable diamond compact must have a second phase which is uniformly distributed through the bonded diamond mass. This second phase will typically not be present in an amount exceeding 20 percent by volume. The compact will be thermally stable in the sense that it can withstand a temperature of 1200° C. in a vacuum, inert or non-oxidising atmosphere without any significant graphitisation of the diamond occurring. Examples of suitable second phases are silicon and silicon/nickel. In these two second phases, the metal will be in elemental or combined form. Examples of particularly suitable thermally stable diamond compacts are those described in U.S. Pat. No. 4,534,773 and British Patent Publication No. 2158086.

The invention provides, in one form, a method of producing a thermally stable diamond compact which has a metallic layer bonded to a surface thereof. The metallic layer renders that compact readily brazeable to the metal matrix of a tool in which it is incorporated. In brazing such a compact to a tool, temperatures of 950° to 1100° C. are generally encountered. It has been found that the bond between the metallic layer and the compact, particularly when the metal of the metallic layer is molybdenum or other high melting refractory metal, is not adversely affected by exposure to such temperatures.

The invention, in another form, can be used to produce a thermally stable diamond compact bonded to a cemented carbide substrate through the metallic layer. In this form, the assembly which is subjected to the conditions of elevated temperature and pressure will include a cemented carbide substrate and the metallic layer will be placed on, and in contact with, a surface of the substrate. The method produces an extremely strong bond between the compact and the cemented carbide substrate which bond is not adversely affected, particularly when the metal of the metallic layer is molybdenum or like high melting refractory metal, when the bonded product is subjected to a temperature as high as 950° to 1100° C. The cemented carbide may be any known in the art such as cemented tungsten carbide, cemented tantalum carbide, cemented titanium carbide and mixtures thereof. The preferred cemented carbide is cemented tungsten carbide. The bonding metal for the cemented carbide will typically be nickel, iron or cobalt.

The metal of the metallic layer may be molybdenum, tantalum, titanium or like high metal refractory metal or nickel. It may also be an alloy containing a dominant or major amount of one of these metals. The alloy, when used, will typically contain at least 80 percent by weight of one of the specified metals. An example of a suitable alloy is a nickel/chromium alloy containing at least 80 percent by weight nickel and up to 20 percent by weight chromium.

The metallic layer is preferably a molybdenum layer. Such a layer, it has been found, bonds particularly well to the compact and does not adversely affect the thermal stability of the compact even when the product, i.e. compact to which the molybdenum layer has been bonded, is subjected to temperatures of the order of 1100° C. This applies equally to a product in which the compact is bonded to a cemented carbide substrate through the molybdenum layer.

Embodiments of the invention will now be described with reference to the accompanying drawing. Referring to FIG. 1, a cemented carbide substrate 10 is provided. On the upper flat surface 12 of the substrate there is placed a thin molybdenum layer 14. On top of the layer 14 is placed a layer 16 of fine diamond particles. On top of the diamond particles is placed a layer 18 of silicon powder. The unbonded assembly is placed in a tantalum canister 20.

Figure 2:
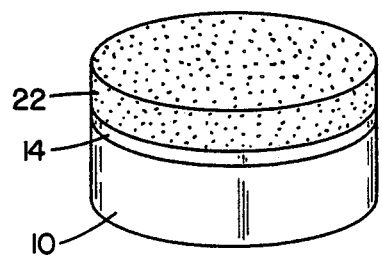
FIG. 2 is a perspective view of a composite diamond compact produced by the method of the invention.

The loaded tantalum canister 20 is placed in the reaction zone of a conventional high temperature/high pressure apparatus. The pressure of the reaction zone is raised to 55 kilobars and the temperature raised to about 1350° C. and maintained at this temperature for a period of 5 minutes. This temperature causes the silicon to melt and infiltrate the diamond mass producing a compact in which the diamond mass contains diamond-to-diamond bonding and a silicon second phase, in the form of silicon and/or silicon carbide, uniformly distributed through the bonded diamond mass. Thereafter, and without removing the canister from the reaction zone, the temperature is raised to about 1600°-1800° C. and maintained at this temperature for about 5 minutes to cause the molybdenum to bond the compact and to the substrate. The resulting bonded composite abrasive compact may be recovered from the reaction zone in the conventional manner. This bonded composite abrasive compact is illustrated by FIG. 2 and consists of a diamond compact 22 bonded to the cemented carbide substrate 10 through the molybdenum layer 14.

Using this method it was found that an excellent bond between the diamond compact and the substrate was achieved, and that this bond is not adversely affected even when subjected to a temperature of 1100° C. for 20 minutes. The strength of the bond in a push-off test was found to be greater than 480 MPa. Moreover, the diamond compact performed well in turning tests.

Figure 3:
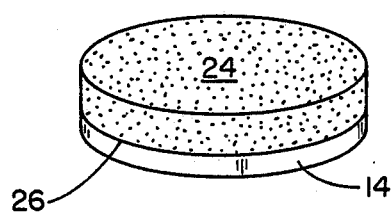
FIG. 3 is a perspective view of a brazeable diamond compact produced by the method of the invention

A brazeable thermally stable compact 24 having a molybdenum layer 14 bonded to a surface 26 thereof (see FIG. 3) was produced using the same unbonded assembly, save that a layer of a suitable material preventing bonding between the molybdenum and the cemented carbide substrate was placed between the upper surface 12 of the carbide substrate and the molybdenum layer 14. An example of a suitable material which prevents bonding between the molybdenum and the cemented carbide substrate is hexagonal boron nitride. Using this same method, but replacing the molybdenum by titanium and tantalum, brazeable thermally stable diamond compacts having titanium and tantalum layers bonded to a surface thereof were produced. In all three cases there was a strong bond between the metallic layer and the compact, with minimal infiltration of the metal of the metallic layer into the compact.

In a further embodiment of the invention, a thermally stable diamond compact and having a molybdenum layer bonded to a surface thereof was produced by applying a pressure of 48 kilobars and a temperature of 1100° C. in the first stage and a temperature of 1250° to 1300° C. in the second stage. In both stages, the relevant temperature was maintained for a period of five minutes. The second phase of the compact was silicon in the form of silicon and/or silicon carbide.

I claim:

1. A method of producing a thermally stable diamond compact having a metallic layer bonded to a surface thereof, the thermally stable diamond compact comprising a mass of diamond particles containing diamond-to-diamond bonding and a second phase uniformly distributed through the diamond mass, and the metal of the metallic layer being selected from the group of molybdenum, tantalum, titanium and like high melting refractory metal, nickel and an alloy containing a dominant amount of any one of these metals, includes the steps of:
   (i) preparing an assembly of a metallic layer, a mass of diamond particles on the metallic layer and a layer of the component or components necessary to form the second phase on the diamond particles, this component or these components having a melting point lower than that of the metallic layer; and
   (ii) subjecting the assembly to conditions of elevated temperature and pressure for a period sufficient to produce the diamond abrasive compact, the temperature being controlled such that there is minimal infiltration of the metallic layer into the diamond mass.

2. A method according to claim 1 wherein the temperature is first raised to a level where the component or components for the second phase are molten allowing their infiltration into the diamond mass and the compact to be produced, but the metallic layer is not molten, and the temperature is thereafter raised to a level where the metallic layer bonds to the thus formed compact.

3. A method according to claim 2 wherein the temperature in the first stage is in the range 1100° to 1350° C. and the temperature in the second stage is higher than that of the first stage.

4. A method according to claim 3 wherein the temperature in the second stage is in the range 1300° C. to 1900° C.

5. A method according to claim 1 wherein the metal of the metallic layer is molybdenum.

6. A method according to claim 1 wherein the elevated pressure which is applied is in the range 27 kilobars to 70 kilobars.

7. A method according to claim 1 wherein the assembly includes a cemented carbide substrate and the metallic layer is placed on, and in contact with, a surface of the substrate.

8. A method according to claim 1 wherein the component for the second phase is silicon.

9. A method of producing a thermally stable diamond compact having a metallic layer bonded to a surface thereof, the thermally stable diamond compact comprising a mass of diamond particles containing diamond-to-diamond bonding and a second phase uniformly distributed through the diamond mass, and the metal of the metallic layer being selected from the group of molybdenum, tantalum, titanium and like high melting refractory metal, nickel and an alloy containing a dominant amount of any one of these metals, includes the steps of:
   (i) preparing an assembly of a metallic layer, a mass of diamond particles on the metallic layer and a layer of the component or components necessary to form the second phase on the diamond particles, this component or these components having a melting point lower than that of the metallic layer; and
   (ii) subjecting the assembly to conditions of elevated temperature and pressure for a period sufficient to produce the diamond abrasive compact, the temperature being first raised to a level in the range 1100° to 1350° C. where the component or components for the second phase are molten allowing their infiltration into the diamond mass and the compact to be produced, but the metallic layer is not molten, and the temperature is thereafter raised to a level higher than that of the first stage and in the range 1300° C. to 1900° C. at which the metallic layer bonds to the thus formed compact.

10. A method according to claim 9 wherein the metal of the metallic layer is molybdenum.

* * * * *